United States Patent [19]

Cromwell et al.

[11] 3,778,730

[45] Dec. 11, 1973

[54] LOW HARMONIC TELEPHONE RINGING GENERATOR

[75] Inventors: Gordon W. Cromwell; Walter G. Borland, both of Waterford, Pa.

[73] Assignee: Elgin Electronics, Inc., Waterford, Pa.

[22] Filed: Nov. 18, 1971

[21] Appl. No.: 199,885

[52] U.S. Cl. .................... 331/109, 330/15, 330/122, 330/195, 331/141, 331/183

[51] Int. Cl. .......................... H03b 3/02, H03b 5/26

[58] Field of Search ...................... 331/75, 109, 110, 331/117 R, 141, 183; 330/13–15, 118, 122, 195; 179/84 T

[56] References Cited

UNITED STATES PATENTS 3,200,348 8/1965 Kammiller et al. ............ 331/109 X 3,074,032 1/1963 Dornhoefer ........................ 331/117

*Primary Examiner*—Roy Lake
*Assistant Examiner*—Siegfried H. Grimm
*Attorney*—Joseph B. Balazs

[57] ABSTRACT

A ringing generator for telephone communication systems having output voltage and frequency regulation. A pair of transistor amplifiers in connection with a plural winding output transformer convert battery voltage to a sinusoidal ringing signal, a feedback signal being derived from a further winding of the output transformer providing output voltage regulation. A further pair of transistors provide variable shunting of the signal applied to the transistor amplifiers for current limiting control.

18 Claims, 1 Drawing Figure

PATENTED DEC 11 1973 3,778,730
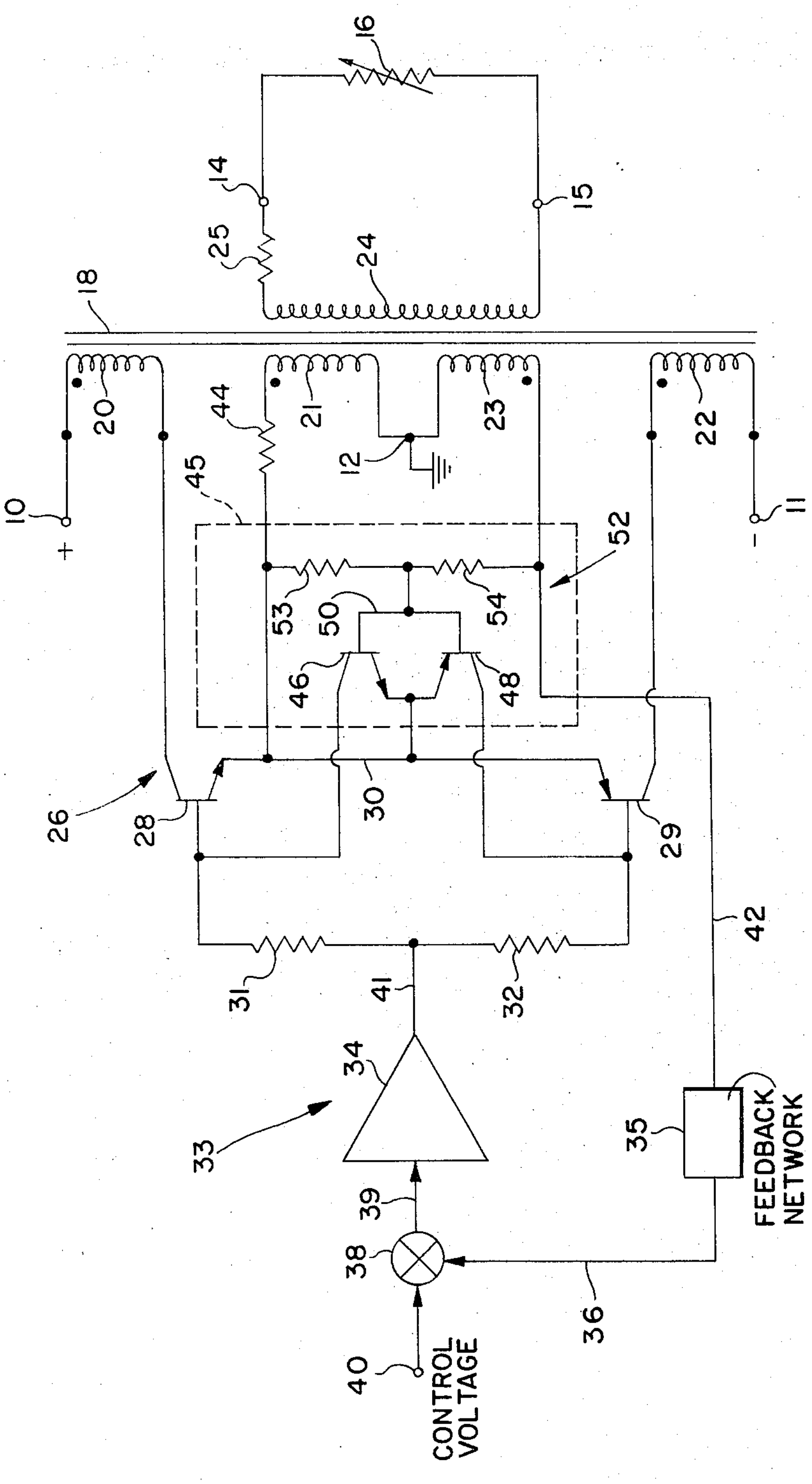

LOW HARMONIC TELEPHONE RINGING GENERATOR

BACKGROUND OF THE INVENTION

This invention relates to oscillator circuits and more particularly to a ringing generator for telephone systems in which DC battery voltage is converted to a sinusoidal ringing signal. Prior art systems have employed conventional forms of oscillator circuits for developing the ringing signal, in some cases using the brute force approach of filtering the desired sinusoidal signal from an applied square wave signal. These types of systems employ a tuned circuit arrangement and because of the relatively low frequency involved, on the order of 20 Hz, require heavy inductors and bulky capacitors to produce a suitable signal at the power levels required. Other types of systems employ conventional oscillator circuits and may include various forms of regulation therein in an attempt to maintain a stable and reliable signal for the wide variations in load impedance encountered.

With the advent of touch-tone dialing and the like and more frequent utilization of telephone lines by communication equipment operative on a tone basis much more stringent standards have been set by the industry for telephone equipment including ringing generators and the like to assure reliability of operation and to minimize the problems of cross-talk and other forms of interference. It is necessary in equipment of this type tnat a relatively clean signal be provided, that the signal be regulated both for frequency and voltage variations and that the equipment be relatively small in package size and weight and produceable at a reasonable cost figure.

SUMMARY OF THE INVENTION

Therefore it is one object of this invention to provide an improved ringing generator for communication equipment having a stable and relatively low harmonic content output signal.

It is another object of this invention to provide telephone ringing equipment which is smaller and lighter than previous devices of this type.

It is a further object of this invention to provide improved telephone ringing equipment which employs a novel feedback arrangement for regulation of output voltage and which maintains isolation from the secondary load circuit.

It is a still further object of this invention to provide an improved telephone ringing generator which utilizes a novel interconnection of primary windings in the generator transformer allowing the utilization of a large turns ratio transformer while maintaining minimum size and weight.

It is still another object of this invention to provide improved telephone ringing equipment which includes a current limit circuit therein for protection of generator components.

These objects are achieved in the instant invention by the provision of a plural primary winding transformer in which sinusoidal signals are developed by energization of combinations of pairs of primary windings by way of transistor control elements in turn energized from a stable oscillator source, with a feedback winding of the transformer providing a control signal to the oscillator for regulating output voltage at a nominal value. By summation of the central signal with the signal appearing in one of the primary windings a signal is developed for application to current limit circuitry employed as a variable shunting device, such circuitry consisting of a commonly fed complementary transistor arrangement.

Other objects and advantages of the present invention will become apparent as the following description proceeds.

To the accomplishment of the foregoing and related ends, the invention, then, comprises the features hereinafter fully described, the following description and the annexed drawing setting forth in detail a certain illustrative embodiment of the invention, this being indicative, however, of but one of the various ways in which the principles of the invention may be employed.

BRIEF DESCRIPTION OF THE DRAWING

The sole FIGURE in this application is a schematic circuit diagram of the preferred embodiment of this invention, partially in block diagram form.

DESCRIPTION OF THE INVENTION

Telephone systems typically employ a company battery or voltage source, in this embodiment of the invention being depicted as a positive voltage terminal 10, a negative voltage terminal 11 and a common terminal 12. It is desired that an oscillatory signal preferably of sinusoidal wave shape be developed at a pair of output terminals 14, 15 for application to a load 16 indicated as a variable resistor, indicative of the widely varying load conditions encountered with equipment of this type where many different telephones are supplied from a common generator source.

Preferably the output terminals 14, 15 are completely isolated from the battery power source and this is conveniently accomplished by the utilization of a power transformer 18 having plural primary windings 20-22 related by the dot convention indicated, secondary winding 24 connected to the output terminals 14, 15, and winding 23 providing the control signal. A secondary winding impedance is schematically shown by the resistor 25 this being an indication of the size of wire employed in the secondary winding 24, the conductivity of same and similar related effects.

A pair of control elements indicated at 26 are employed for application of the battery voltage in a controlled manner to certain of the primary windings 20–22 of the transformer 18, such control elements 26 consisting of NPN and PNP transistors 28, 29 having commonly connected emitter leads by way of line 30, in turn connected to one side of the primary winding 21, the other side of the primary winding 21 being connected to the common terminal 12. The collector electrode of the NPN transistor 28 is connected to one side of a further primary winding 20, the other side of the winding being connected to the positive terminal 10 of the power source while the collector electrode of the PNP transistor 29 is connected to one side of the primary winding 22, the other side of the winding being connected to the negative terminal 11 of the power source.

A suitable oscillatory signal is applied to the base electrodes of the transistors 28, 29 by way of resistors 31, 32, respectively, being developed in an oscillator circuit indicated generally at 33, being depicted by the amplifier 34 and the feedback network 35, the output 36 of the latter being routed by way of a combining circuit 38 to the input 39 of the amplifier 34. An input terminal 40 is connected to the combining circuit indicative of the application of a controlling voltage for proper operation of the oscillator 33 or for controlled energization of same. Preferably the oscillator 33 is of the Wien-bridge type, a circuit configuration well established in the art, and characterized by a stable mode of operation at a nominal operating frequency determined in part by the impedance characteristics and filtering effect of the feedback network 35 which returns a portion of the output 41 of the amplifier 34 to the input 39 thereof in proper phase and amplitude to sustain oscillation. Other types of oscillators could be employed as well in similar circuit configurations, the circuit of the preferred embodiment of the invention being characterized however in variation of amplitude of the oscillator signal as realized at the output 41 of the amplifier 34 as a function of the voltage received on line 42 connected to the feedback network 35.

The output 41 of the oscillator 33 is applied to the base-emitter junctions of the transistors 28, 29 by way of resistors 31, 32 to control the conduction characteristics thereof, causing alternate actuation of the NPN and PNP transistors 28, 29. Thus on the positive half cycle of the oscillator output 41 the NPN transistor 28 will become forwardly biased establishing a conduction path from the positive terminal 10 of the power source through the primary winding 20, through the collector-emitter path of the transistor 28 and the primary winding 21 to the common terminal 12. On the alternate negative half cycle a current path will be established from the common terminal 12 through primary winding 21, the collector-emitter path of the PNP transistor 29 and primary winding 22 to the negative terminal 11 of the power source. Such alternate conduction will continue at the frequency determined by the oscillator 33 causing bidirectional current flow in primary winding 21 and unidirectional current flow in primary windings 20, 22 and consequent development of a suitable output voltage in the secondary winding 24 of the transformer 18.

This connection of the primary windings 20, 21, 22 of the transformer 18 allows the circuit to be operated from a relatively higher input voltage thereby reducing the necessary transformer turns ratio required to maintain the desired voltage at the output terminals 14, 15. Conversely, this circuit arrangement minimizes current in the primary windings of the transformer 18 and thus minimizes also the losses in the transistors 28, 29 providing improved package size efficiency as well as improved electrical load regulation. The smaller overall size transformer as well as lower capacity transistor components, usually reflected in the size of the heat sink associated therewith, forms an appreciable portion of the overall package size.

A disadvantage in prior art circuits similar to that of the instant invention is that the transformer primary winding resistance is multiplied by the turns ratio squared when transferred to the secondary side of the transformer, such resistance being schematically indicated by the resistor 44. Previously this problem could be overcome by connecting the feedback circuitry directly to the output which would provide very good regulation but which would sacrifice the isolation between the DC and output portions of the circuit. An alternate solution is to utilize a separate feedback transformer to maintain isolation but at the expense of adding to the cost and increasing the package size and weight. A most satisfactory solution is provided by the teachings of this invention in the connection of the winding 23 of the transformer 18, identified as the feedback winding, to supply a signal to the feedback network 35 by way of line 42, the feedback winding 23 being referenced to the common terminal 12 of the power source. The feedback winding 23 is poled to produce voltage of polarity opposite to that voltage occurring in the primary winding 21 and in normal operation of the circuit the feedback winding voltage will be maintained constant and consequently that portion of the change in output voltage at terminals 14, 15 caused by variation of current in the primary winding resistance 44 will be eliminated for changes in the load impedance 16.

A further advantage of this circuit arrangement is current limit circuitry compatible therewith indicated in the dashed lines 45 consisting of complementary NPN and PNP transistors 46, 48 having a common emitter connection and connected to the emitters of the amplifier transistors 28, 29 by way of line 30. The collector electrode of the NPN transistor 46 is connected to the base electrode of the NPN transistor 28 while the PNP transistor 48 in the current limit circuit 45 is similarly connected to transistor 29. The base electrodes of the current limit transistors 46, 48 are connected in common by line 50 and are energized from the center tap of a voltage divider 52 consisting of series resistors 53, 54 connected respectively to the primary winding 21 and feedback winding 23.

In this arrangement the voltage divider 52 provides a summation of the voltages occurring at the primary winding 21, and the feedback winding 23, any deviations from a norm causing change in bias of the transistors 46, 48 in the current limit circuit 45 and thus a controlled shunting of the base-emitter junctions of the amplifier transistors 28, 29. Thus shunting is effected by the change in impedance of the collector-emitter paths of the transistors 46, 48 in the current limit circuit 45. The sum of the voltages occurring in the primary winding 21, and feedback winding 23 is proportional to the product of the current in winding 21 and the resistance 44 of that winding and thus is useful as a control for the current limiting function. This arrangement eliminates the necessity for introducing current-sensing resistors in effective serial connection with the primary winding 21 which arrangement is employed in typical circuits and which adds to the cost and complexity of the circuit and introduces deterioration in the load regulation.

The embodiments of the invention in which an exclusive property or privilege is claimed are defined as follows:

1. A ringing generator for communication equipment, comprising an output transformer for supplying a signal to a load, said transformer having plural primary windings, a DC power source connected for providing a source of current to said plural primary windings, first and second control elements connected respectively to separate primary windings of said transformer, said control elements further being in connection with a further common primary winding, said control elements controlling current flow from said DC source through said respective primary windings, and means for alternately energizing said control elements for obtaining such controlled current flow to produce bidirectional current flow in said further common primary winding and unidirectional flow in said separate primary windings, thereby to develop an AC output voltage approximating a sinusoidal voltage in said output transformer.

2. A generator as set forth in claim 1 wherein said power source comprises positive and negative voltage terminals and a common terminal, said first control element being in series connection with one of said separate primary windings and said common winding between said positive and common terminals, said second control element being in series connection with another of said separate primary windings and said common winding between said negative and common terminals.

3. A generator as set forth in claim 2 wherein said energizing means comprises an oscillator including said first and second control elements for alternate energization thereof.

4. A generator as set forth in claim 3 wherein said control elements comprise transistors having collector-emitter paths in the series connection between said power terminals and said common terminal and base electrodes energized by said oscillator.

5. A generator as set forth in claim 4 wherein said transistors comprise an NPN transistor and a PNP transistor having directly coupled emitter electrodes.

6. A generator as set forth in claim 3 further including a feedback winding on said transformer, said feedback winding being interconnected with said oscillator for providing output voltage regulation.

7. A generator as set forth in claim 6 wherein said feedback winding is in connection with said common terminal of said power supply and is poled to develop a voltage of opposite polarity to that voltage occurring in said common winding.

8. A generator as set forth in claim 7 further including current limiting means responsive to the sum of the voltages occurring in said feedback and said common windings and operatively connected with said control elements for controlling current flow therein.

9. A generator as set forth in claim 8 wherein said current limiting means comprises variable impedance means in connection with said control elements for shunting the signal applied from said oscillator as a function of said voltage sum.

10. A generator as set forth in claim 9 wherein said control elements comprise complementary transistors and said variable impedance means comprise further complementary transistors having a common base connection, said current limiting means further comprising a voltage divider in connection with said common and said feedback windings for energizing said common base connection.

11. Apparatus for developing a regulated AC output voltage approximating a sinusoidal voltage from a DC power source for application to a load, comprising a transformer having first and second primary windings and a secondary winding adapted for connection to the load, said transformer further including a feedback winding, means for controllably connecting said DC power source respectively to said first and second primary windings in opposite polarities to produce a sinusoidal signal in said secondary winding, an oscillator including said means for controllably connecting for controlling the frequency of connection of same and the control of said DC power by magnitude of oscillator signal, said feedback winding being connected to said oscillator for modifying the amplitude of said oscillator signal for regulating the voltage in said secondary winding, whereby said oscillator including said means for controllably connecting determines connection of said DC power source to said primary windings to effect production of said AC output voltage in said secondary winding.

12. Apparatus as set forth in claim 11 wherein said DC power source comprises positive, negative and common terminals, said transformer further comprises a common primary winding coupled to said common terminal and to said means for controllably connecting, said feedback winding being connected to said common terminal and being poled to develop a voltage in opposition to the voltage occurring in said common primary winding.

13. Apparatus as set forth in claim 12 wherein said oscillator comprises a frequency determinative feedback network, said network being adapted to receive the signal from said feedback winding.

14. Apparatus as set forth in claim 13 wherein said oscillator is a Wien-bridge type oscillator operative at a single frequency of oscillation.

15. Apparatus as set forth in claim 12 wherein said means for controllably connecting comprises NPN and PNP transistors having emitter electrodes connected in common and to said common primary winding and collector electrodes operatively connected respectively to said positive and negative terminals of said power source.

16. Apparatus as set forth in claim 15 wherein said first primary winding of said transformer is in series connection between said postive terminal and the collector electrode of said NPN transistor and said second primary winding of said transformer is in series connection between said negative terminal and the collector electrode of said PNP transistor.

17. Apparatus as set forth in claim 16 further including means for summing the voltages occurring in said common primary winding and in said feedback winding, and means operative in response to said voltage sum for limiting current flow in said means for controllably connecting.

18. Apparatus as set forth in claim 17 wherein said limiting means comprises complementary transistors in shunt connection with the base-emitter paths of said means for controllably connecting.

* * * * *